United States Patent
Johns (10) Patent No.: US 12,262,736 B1
(45) Date of Patent: Apr. 1, 2025

(54) SMART PHONE WITH INTEGRATED VAPE PEN

(71) Applicant: Christopher Johns, Buckeye, AZ (US)

(72) Inventor: Christopher Johns, Buckeye, AZ (US)

( * ) Notice: Subject to any disclaimer, the term of this patent is extended or adjusted under 35 U.S.C. 154(b) by 448 days.

(21) Appl. No.: 17/745,985

(22) Filed: May 17, 2022

Related U.S. Application Data (63) Continuation-in-part of application No. 16/741,809, filed on Jan. 14, 2020, now Pat. No. 11,452,311.

(51) Int. Cl.

| | |
|---|---|
| *A24F 15/01* | (2020.01) |
| *A24F 15/18* | (2006.01) |
| *A24F 40/10* | (2020.01) |
| *A24F 40/40* | (2020.01) |
| *A24F 40/53* | (2020.01) |
| *H04M 1/02* | (2006.01) |
| *H04M 1/22* | (2006.01) |
| *H04M 1/72409* | (2021.01) |
| *H02J 7/00* | (2006.01) |
| *H02J 50/10* | (2016.01) |

(52) U.S. Cl.
CPC .............. *A24F 15/01* (2020.01); *A24F 40/10* (2020.01); *A24F 40/40* (2020.01); *A24F 40/53* (2020.01); *H04M 1/0264* (2013.01); *H04M 1/0266* (2013.01); *H04M 1/22* (2013.01); *H04M 1/724092* (2022.02); *H02J 7/0042* (2013.01); *H02J 50/10* (2016.02)

(58) Field of Classification Search
CPC .......... A24F 15/18; A24F 40/10; A24F 40/40; A24F 15/01; H04M 1/724092
See application file for complete search history.

(56) References Cited

U.S. PATENT DOCUMENTS

| | | | |
|---|---|---|---|
| 9,197,726 B2 * | 11/2015 | Stanimirovic | A24F 40/95 |
| 9,433,242 B1 * | 9/2016 | Buffone | A24F 15/18 |
| 9,641,208 B2 | 5/2017 | Sela | |
| 9,668,518 B2 | 6/2017 | Esses | |
| 9,833,020 B2 * | 12/2017 | Shabat | H04M 1/21 |
| 10,003,372 B2 | 6/2018 | Stanimirovic | |
| 10,274,198 B2 | 4/2019 | Tijerina | |
| 10,966,463 B2 * | 4/2021 | Valdez-Gibson | A24F 15/18 |
| 11,452,311 B1 * | 9/2022 | Johns | A24F 15/01 |
| 2015/0097513 A1 * | 4/2015 | Liberti | A24F 40/00 224/245 |
| 2015/0101940 A1 | 4/2015 | Ash | |
| 2016/0345628 A1 * | 12/2016 | Sabet | H04M 1/21 |
| 2021/0083491 A1 * | 3/2021 | Stanimirovic | H04B 1/3888 |

FOREIGN PATENT DOCUMENTS

EP      2903245      8/2015

* cited by examiner

*Primary Examiner* — Hae Moon Hyeon
(74) *Attorney, Agent, or Firm* — Kyle A. Fletcher, Esq.

(57) ABSTRACT

The smart phone with integrated vape pen comprises a smart phone and a vape pen. The vape pen may be located within a phone case of the smart phone. The vape pen may extend from the phone case for use and may retract into the phone case for storage. The phone case may protect the internal components of the smart phone and the vape pen. A vape pen cover may conceal the vape pen when the vape pen is not in use. In some embodiments, the vape pen may be detached from the phone case for use. As a non-limiting example, the vape pen may slide out of the phone case to be used and may slide into the phone case when not in use.

18 Claims, 5 Drawing Sheets

SMART PHONE WITH INTEGRATED VAPE PEN

CROSS REFERENCES TO RELATED APPLICATIONS

This application is a continuation-in-part of U.S. application Ser. No. 16/741,809, filed Jan. 14, 2020.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of personal communication devices and vaping systems, more specifically, a smart phone with integrated vape pen.

SUMMARY OF INVENTION

The smart phone with integrated vape pen comprises a smart phone and a vape pen. The vape pen may be located within a phone case of the smart phone. The vape pen may extend from the phone case for use and may retract into the phone case for storage. The phone case may protect the internal components of the smart phone and the vape pen. A vape pen cover may conceal the vape pen when the vape pen is not in use. In some embodiments, the vape pen may be detached from the phone case for use. As a non-limiting example, the vape pen may slide out of the phone case to be used and may slide into the phone case when not in use.

An object of the invention is to provide a smart phone capable of initiating and receiving voice calls, sending and receiving text messages, taking photographs, and other common smart phone functions.

Another object of the invention is to provide a vaping system concealed within the smart phone case.

A further object of the invention is to provide a mechanism to extend the vape pen for use and retract the vape pen for storage.

Yet another object of the invention is to provide a vape pen cover to conceal the mouthpiece of the vape pen.

These together with additional objects, features and advantages of the smart phone with integrated vape pen will be readily apparent to those of ordinary skill in the art upon reading the following detailed description of the presently preferred, but nonetheless illustrative, embodiments when taken in conjunction with the accompanying drawings.

In this respect, before explaining the current embodiments of the smart phone with integrated vape pen in detail, it is to be understood that the smart phone with integrated vape pen is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the smart phone with integrated vape pen.

It is therefore important that the claims be regarded as including such equivalent construction insofar as they do not depart from the spirit and scope of the smart phone with integrated vape pen. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
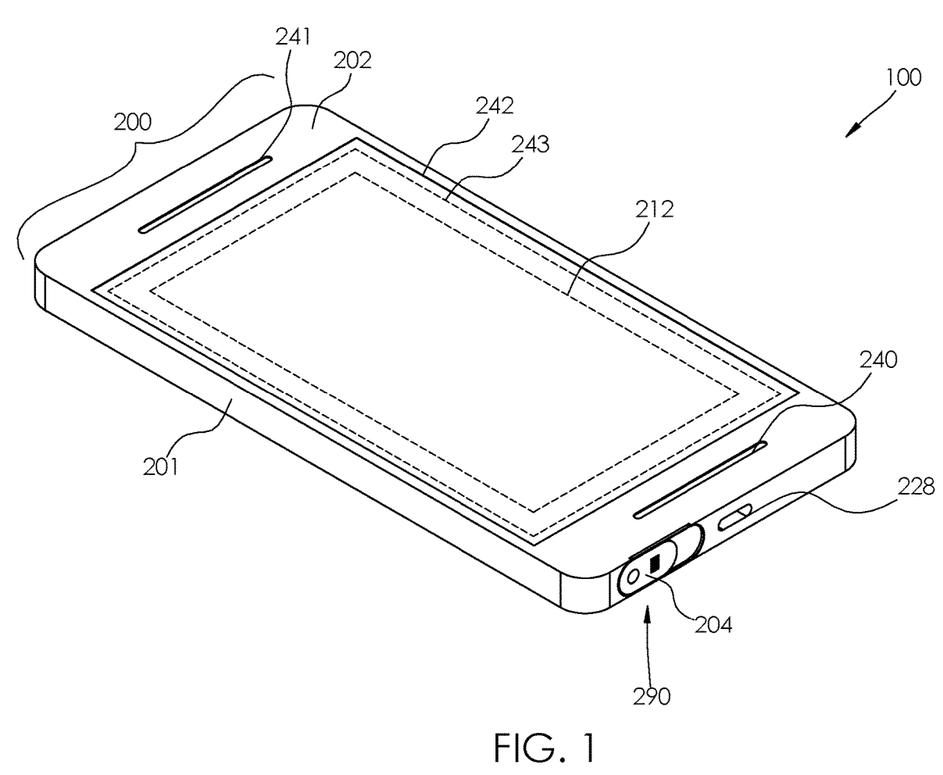
FIG. 1 is an isometric view of an embodiment of the disclosure.
Figure 2:
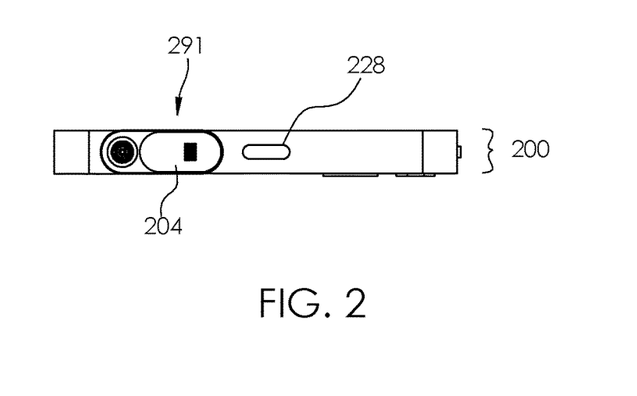
FIG. 2 is a bottom view of an embodiment of the disclosure.
Figure 3:
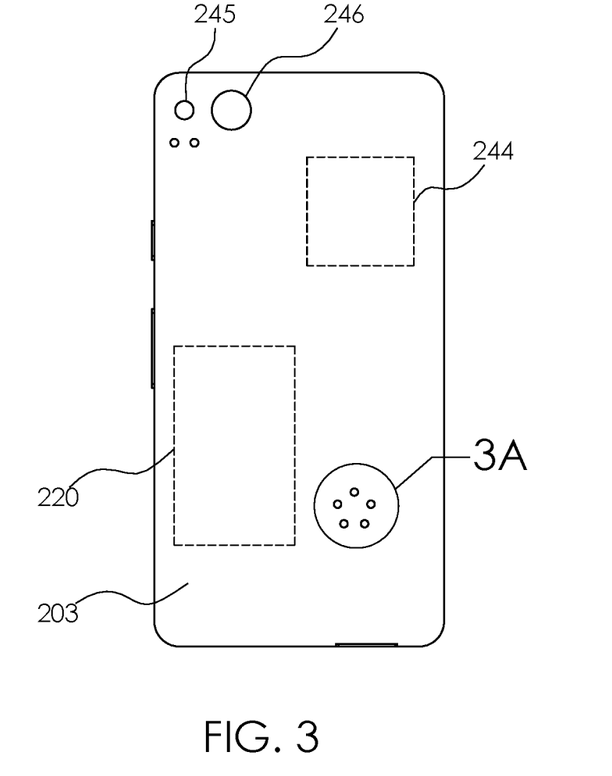
FIG. 3 is a back view of an embodiment of the disclosure.
Figure 3A:
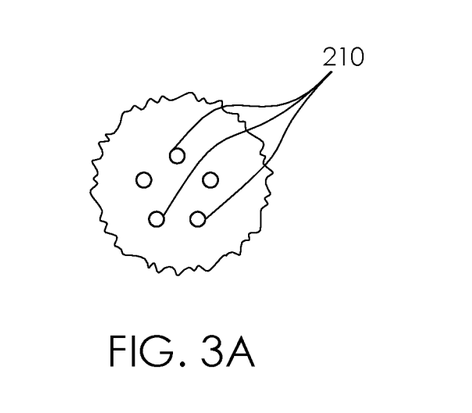
FIG. 3A is a detail view of an embodiment of the disclosure illustrating the area designated 3A in FIG. 3.
Figure 4:
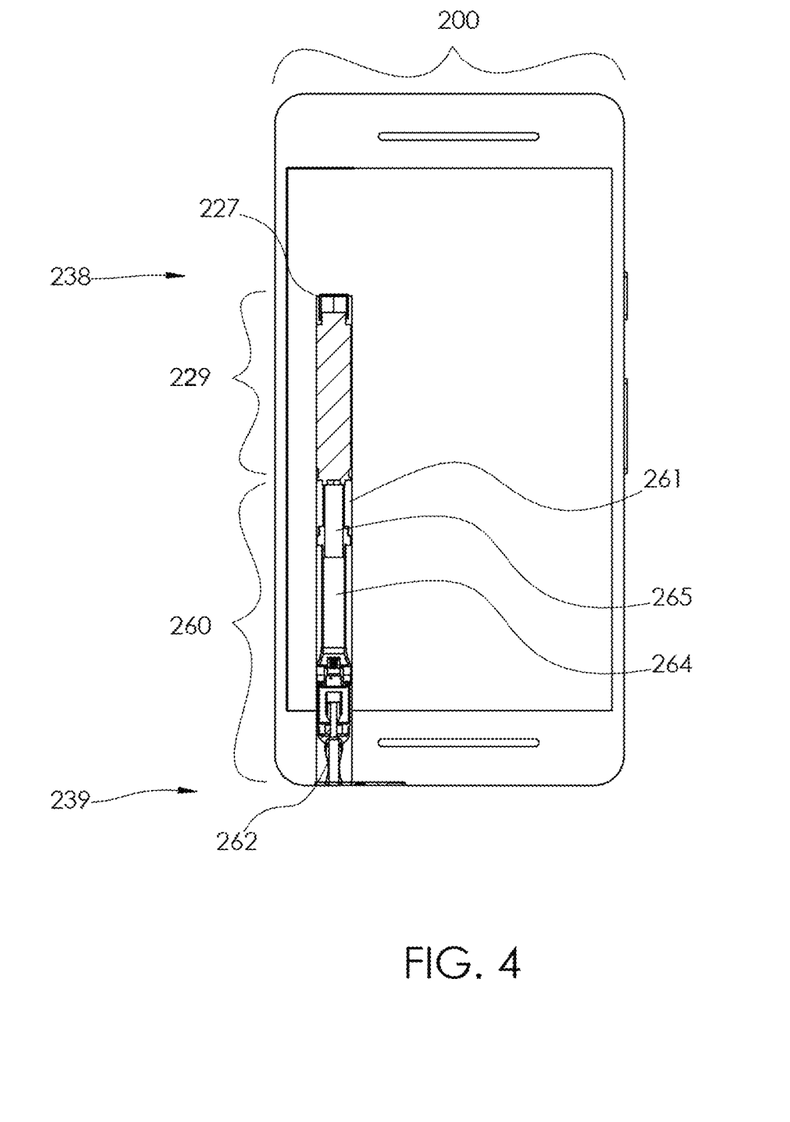
FIG. 4 is a cross-sectional view of an embodiment of the disclosure illustrating the vape pen components within the pen slot.
Figure 5:
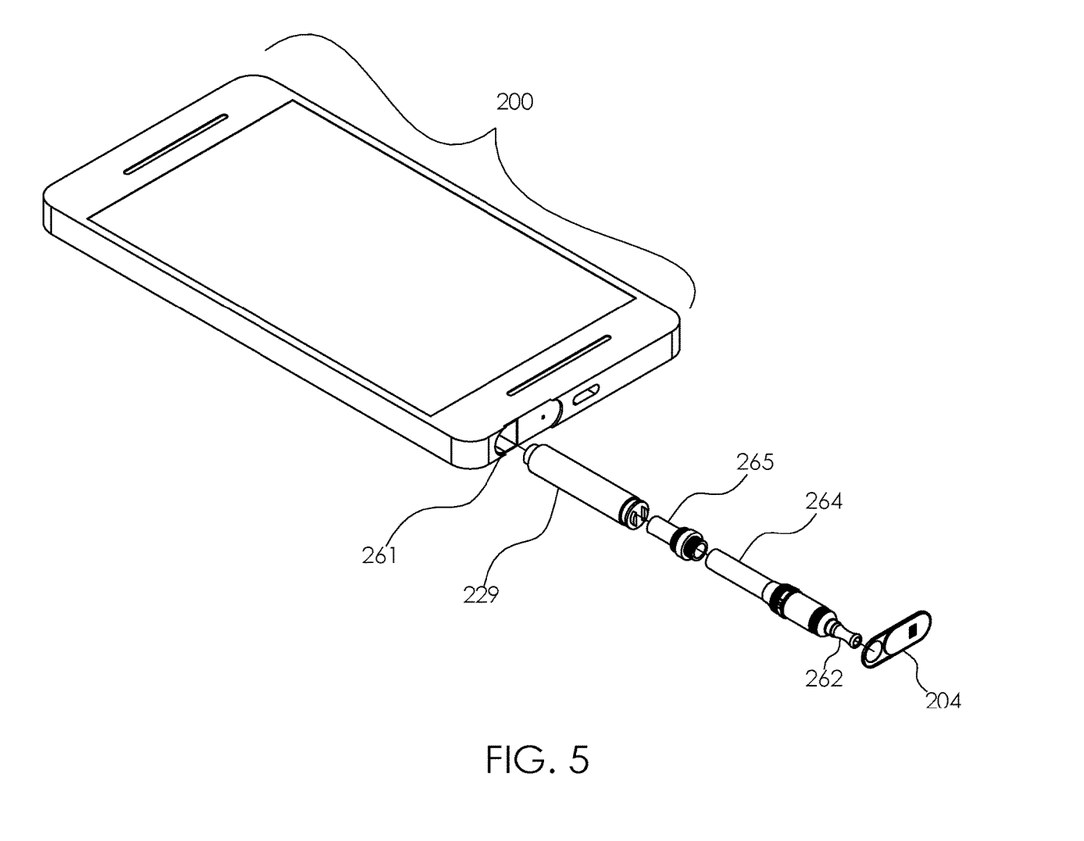
FIG. 5 is an exploded view of an embodiment of the disclosure illustrating the vape pen components.
Figure 6:
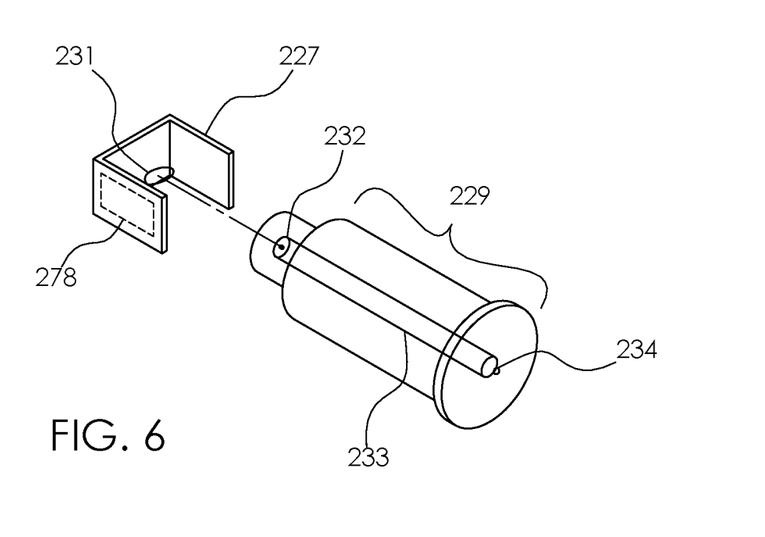
FIG. 6 is a detail view of an embodiment of the disclosure illustrating the bracket and the spring-loaded member.
Figure 7:
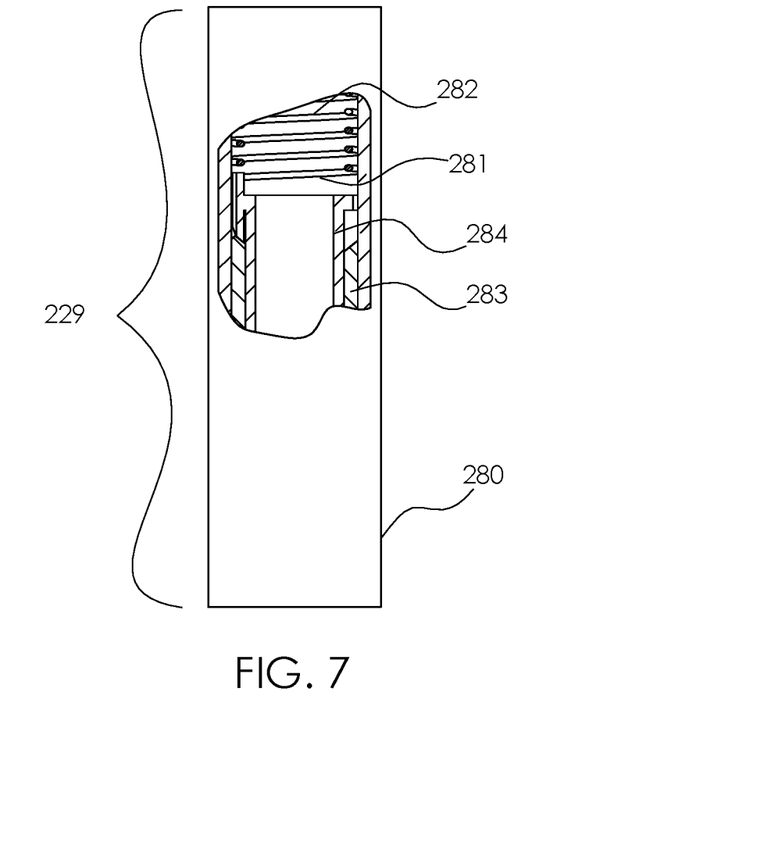
FIG. 7 is a front detail view of an embodiment of the disclosure illustrating the spring-loaded member.

Detailed reference will now be made to a first potential embodiment of the disclosure, which is illustrated in FIGS. 1 through 7.

The smart phone with integrated vape pen 100 (hereinafter invention) comprises a smart phone 200 and a vape pen 260. The vape pen 260 may be located within a phone case 201 of the smart phone 200. The vape pen 260 may extend from the phone case 201 for use and may retract into the phone case 201 for storage.

As non-limiting examples, the smart phone 200 may comprise a microphone 240, a speaker 241, a display screen 242, a touch sensitive overlay 243, a Global Positioning System 244, a camera 245, a flashlight 246, or combinations thereof. The microphone 240 and the speaker 241 may be used in conjunction with cellular network circuitry to carry on a conversation using the smart phone 200. The Global Positioning System (GPS) 244 may determine the location of the smart phone 200 using signals originating at a plurality of GPS satellites in orbit around the Earth. The camera 245 may capture a still image of a scene in front of the smart phone 200. The camera 245 may capture a moving video as a sequence of still images. The flashlight 246 may provide illumination when requested by a user. The flashlight 246 may be also be operable as a flash strobe for the camera 245. The display screen 242 and the touch sensitive overlay 243 may be adapted to facilitate interaction between the user and the smart phone 200. The smart phone 200 may be capable of communicated with the Internet via the cellular phone network. As non-limiting examples, the user may interact with the display screen 242 and the touch sensitive overlay 243 to initiate and terminate calls, to run application programs, to take photographs and/or video using the camera 245, to determine a location and/or directions using the Global Positioning System 244, to illuminate and extinguish the flashlight 246, to send and receive email, or to browse the Internet.

The smart phone 200 may be enclosed within the phone case 201. The phone case 201 may protect the display screen 242, the microphone 240, the speaker 241, the Global Positioning System 244, the camera 245, and internal circuitry. The phone case 201 may be defined by a front cover 202 and a rear cover 203. In some embodiments, the front cover 202 and the rear cover 203 may couple at a seam that encircles the edge of the smart phone 200 such that the phone case 201 may be opened for access to internal circuitry. The display screen 242, the touch sensitive overlay 243, the microphone 240, and the speaker 241 may be exposed at the front cover 202. The camera 245 and the flashlight 246 may be exposed at the rear cover 203. In some embodiments, the smart phone 200 may be a front-facing camera exposed on the front cover 202.

The vape pen 260 may be positioned within a pen slot 261. The pen slot 261 may be located within the phone case 201 between the front cover 202 and the rear cover 203. The pen slot 261 may be oriented longitudinally within the phone case 201. The pen slot 261 may be located behind the display screen 242 such that the pen slot 261 does not limit the lateral or longitudinal dimensions of the display screen 242. The pen slot 261 may be exposed at an edge of the phone case 201 for accessing the vape pen 260. In a preferred embodiment, the pen slot 261 may be exposed at the bottom edge of the phone case 201.

The phone case 201 of the smart phone 200 may comprise a vape pen cover 204. The vape pen cover 204 may move between a cover closed position 290 and a cover open position 291. The vape pen 260 may be accessible for use when the vape pen cover 204 is moved to the cover open position 291. The vape pen 260 may be inaccessible and protected behind the vape pen cover 204 when the vape pen cover 204 is moved to the cover closed position 290.

The phone case 201 of the smart phone 200 may comprise ventilation 210 such that heat generated by the vape pen 260 may escape from within the phone case 201. As a non-limiting example, the ventilation 210 may comprise a plurality of apertures located on the rear cover 203 of the phone case 201 adjacent to the pen slot 261.

The smart phone 200 may comprise a battery 220. The battery 220 may be a source of electrical energy to operate the smart phone 200 and the vape pen 260. The battery 220 may be replaceable or rechargeable. The smart phone 200 may include a recharging port 228 for attaching a power cord to recharge the battery 220. In some embodiments, the invention 100 may employ a wireless charging capability. Wireless phone charging may use an induction coil that charges the battery 220 via electromagnetic induction. The charger (not shown) may use an induction coil to create an alternating electromagnetic field, which the receiver coil in the smart phone 200 may convert back into electricity to be fed into the battery 220.

A bracket 227 may be permanently coupled to the smart phone at a first end 238 of the pen slot 261. The bracket 227 may detachably couple to a spring loaded member 229. The spring loaded member 229 may extend and retract the vape pen 260 with respect to the pen slot 261. When extended, a mouthpiece 262 of the vape pen 260 may be accessible via a second end 239 of the pen slot 261. The spring loaded member 229 may be affixed between the vape pen 260 and the bracket 227. The bracket 227 may use a magnet 278 to attract and secure the spring loaded member 229 thereto. The battery 220 may be electrically coupled to bracket wire contacts 231 located on the bracket 227. The bracket wire contacts 231 may interface with a first member contact 232 provided on the spring loaded member 229. Within the spring loaded member 229, a second member contact 234 may be electrically coupled to the first member contact 232 via a member wire 233.

The vape pen 260 may include a vaporizer atomizer 265. The vaporizer atomizer 265 may heat a vaping fluid and may convert the vaping fluid into an aerosol that may be inhaled. The vaporizer atomizer 265 may connect with and may receive electrical power from the battery 220 via the second member contact 234.

The spring loaded member 229 may be adapted to operate in the same manner as a spring-loaded pen mechanism, which enables a user to click on the pen to extend and retract the pen head. The spring loaded member 229 may be further defined with an outer housing 280, a spring 281, an extendable member 282, an upper cam 283, and a lower cam 284. Pushing on the mouthpiece of the vape pen 260, may engage the upper cam 283 against the lower cam 284 to either extend or retract the extendable member 282 with respect to the outer housing 280. Pushing on the mouthpiece 262 of the vape pen 260 may cause the mouthpiece 262 to either extend from or retract into the pen slot 261 of the invention 100.

The vape pen 260 may be further defined with a fluid storage cartridge 264. The vaping fluid may be stored within the fluid storage cartridge 264.

In some embodiments, the vape pen 260 may be detached from the phone case 201 for use. As a non-limiting example, the vape pen 260 may slide out of the phone case 201 to be used and may slide into the phone case 201 when not in use.

In some embodiments, a vaping application program 212 executing on the smart phone 200 may monitor and control operation of the vape pen 260. As a non-limiting example, the vaping application program 212 may display information on the display screen 242 regarding the operational status of the vape pen 260 and associated components of the smart phone 200. The vaping application program 212 may monitor the battery 220 and report when the battery 220 needs to be recharged. As a further non-limiting example, the vaping application program 212 may provide one or more on-screen controls to change the operational status of the vape pen 260. The vaping application program 212 may enable the user to turn the vape pen 260 on and off.

In use, the smart phone 200 may be operable to initiate and receive voice calls, send and receive text messages, browse the Internet, take photographs, record video clips, determine and report the geographic location of the smart phone 200, illuminate an area, and other ordinary functions of a phone. To vape, the user may slide the vape pen cover 204 to reveal the mouthpiece 262 of the vape pen 260. The user may press on the mouthpiece 262 to cause the spring loaded member 229 to extend the vape pen 260 out of the pen slot 261. The vape pen 260 may be activated to cause the vaporizer atomizer 265 to heat thus vaporizing the vaping fluid. As a non-limiting example, the vape pen 260 may be activated using control functions presented on the display screen 242 of the smart phone 200 by the vaping application program 212 and selected via the touch sensitive overlay 243.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, an "aperture" may be an opening in a surface. Aperture may be synonymous with hole, slit, crack, gap, slot, or opening.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used in this disclosure, a "camera" may be a sensor that converts light into electric signals that encode the spatial orientation of the captured light in a manner that reproduces the images seen by a human eye.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used herein, the words "couple", "couples", "coupled" or "coupling", may refer to connecting, either directly or indirectly, and does not necessarily imply a mechanical connection.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used herein, "GPS" may refer to a device that uses signals received from a system of navigational satellites to determine the position of the device. GPS is an acronym for Global Positioning System.

As used in this disclosure, a "housing" may be a rigid or semi-rigid casing that encloses and protects one or more devices.

As used in this disclosure, an "image" may be an optical representation or reproduction of an indicia or of the appearance of something or someone.

As used in this disclosure, the word "lateral" may refer to the sides of an object or movement towards a side. Lateral directions are generally perpendicular to longitudinal directions. "Laterally" may refer to movement in a lateral direction.

As used herein, the word "longitudinal" or "longitudinally" may refer to a lengthwise or longest direction.

As used in this disclosure, a "magnet" may be an ore, alloy, or other material that has its component atoms arranged so the material exhibits properties of magnetism such as attracting iron-containing objects or aligning itself in an external magnetic field.

As used in this disclosure, a "microphone" may be a transducer that converts the energy from vibration into electrical energy. The sources of vibrations include, but are not limited to, acoustic energy.

As used herein, "mouthpiece" may refer to an element that is a designed to have lips placed against it.

As used herein, "smart phone" or "smartphone" may refer to a personal communication device that incorporates cellular phone calling and texting capabilities along with advanced features. Non-limiting examples of the advanced features of a smart phone may include camera functions, multimedia functions (such as music and video recording and playback and gaming), internet functions (such as web browsing and file uploading/downloading), and Global Positioning System capabilities.

As used in this disclosure, a "speaker" may be an electrical transducer that converts an electrical signal into an audible sound; also known as a loudspeaker.

As used in this disclosure, a "spring" may be a device that is used to store mechanical energy. This mechanical energy will often be stored by deforming an elastomeric material that is used to make the device, by the application of a torque to a rigid structure, or by a combination thereof. In some embodiments, the rigid structure to which torque is applied may be composed of metal or plastic.

As used herein, "spring loaded" may refer to an item that contains a compressed or stretched spring that moves one part relative to another part.

As used in this disclosure, a "vent" may be an opening in the structure that allows air to enter or escape.

As used in this disclosure, "wireless" may be an adjective that is used to describe a communication channel that does not require the use of physical cabling.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, The inventor claims:

1. A smart phone with integrated vape pen comprising:
a smart phone and a vape pen;
wherein the vape pen is located within a phone case of the smart phone;
wherein the vape pen extends from the phone case for use and retracts into the phone case for storage;
wherein the vape pen is positioned within a pen slot;
wherein a bracket is permanently coupled to the smart phone at a first end of the pen slot;
wherein the bracket detachably couples to a spring loaded member;
wherein the spring loaded member extends and retracts the vape pen with respect to the pen slot;
wherein when extended, a mouthpiece of the vape pen is accessible via a second end of the pen slot.

2. The smart phone with integrated vape pen according to claim 1
wherein the smart phone is enclosed within the phone case;
wherein the phone case is defined by a front cover and a rear cover;
wherein a display screen, a touch sensitive overlay, a microphone, and a speaker are exposed at the front cover;
wherein a camera and a flashlight are exposed at the rear cover.

3. The smart phone with integrated vape pen according to claim 2
wherein the pen slot is located within the phone case between the front cover and the rear cover;
wherein the pen slot is oriented longitudinally within the phone case.

4. The smart phone with integrated vape pen according to claim 3
wherein the pen slot is located behind the display screen such that the pen slot does not limit the lateral or longitudinal dimensions of the display screen;
wherein the pen slot is exposed at an edge of the phone case for accessing the vape pen.

5. The smart phone with integrated vape pen according to claim 4
wherein the pen slot is exposed at the bottom edge of the phone case.

6. The smart phone with integrated vape pen according to claim 5
wherein the phone case of the smart phone comprises a vape pen cover;
wherein the vape pen cover moves between a cover closed position and a cover open position.

7. The smart phone with integrated vape pen according to claim 6
wherein the vape pen is accessible for use when the vape pen cover is moved to the cover open position;
wherein the vape pen is inaccessible and protected behind the vape pen cover when the vape pen cover is moved to the cover closed position.

8. The smart phone with integrated vape pen according to claim 7
wherein the phone case of the smart phone comprises ventilation such that heat generated by the vape pen escapes from within the phone case.

9. The smart phone with integrated vape pen according to claim 8
wherein the smart phone comprises a battery;
wherein the battery is a source of electrical energy to operate the smart phone and the vape pen;
wherein the battery is replaceable or rechargeable;
wherein the smart phone includes a recharging port for attaching a power cord to recharge the battery.

10. The smart phone with integrated vape pen according to claim 9
wherein the smart phone with integrated vape pen employs a wireless charging capability;
wherein wireless phone charging uses an induction coil that charges the battery via electromagnetic induction;
wherein the charger uses an induction coil to create an alternating electromagnetic field, which the receiver coil in the smart phone converts back into electricity to be fed into the battery.

11. The smart phone with integrated vape pen according to claim 9
wherein the spring loaded member is affixed between the vape pen and the bracket;
wherein the bracket uses a magnet to attract and secure the spring loaded member thereto.

12. The smart phone with integrated vape pen according to claim 11
wherein the battery is electrically coupled to bracket wire contacts located on the bracket;
wherein the bracket wire contacts interface with a first member contact provided on the spring loaded member;
wherein within the spring loaded member, a second member contact is electrically coupled to the first member contact via a member wire.

13. The smart phone with integrated vape pen according to claim 12
wherein the vape pen includes a vaporizer atomizer;
wherein the vaporizer atomizer heats a vaping fluid and converts the vaping fluid into an aerosol that is inhaled;
wherein the vaporizer atomizer connects with and receives electrical power from the battery via the second member contact.

14. The smart phone with integrated vape pen according to claim 13
wherein the spring loaded member is adapted to operate in the same manner as a spring-loaded pen mechanism, which enables a user to click on the pen to extend and retract the pen head;
wherein the spring loaded member is further defined with an outer housing, a spring, an extendable member, an upper cam, and a lower cam, pushing on the mouthpiece of the vape pen, engages the upper cam against the lower cam to either extend or retract the extendable member with respect to the outer housing, pushing on the mouthpiece of the vape pen causes the mouthpiece to either extend from or retract into the pen slot of the smart phone with integrated vape pen.

15. The smart phone with integrated vape pen according to claim 14
wherein the vape pen is further defined with a fluid storage cartridge;
wherein a vaping fluid is stored within the fluid storage cartridge.

16. The smart phone with integrated vape pen according to claim 15
wherein the vape pen is detached from the phone case for use.

17. The smart phone with integrated vape pen according to claim 16 wherein the vape pen slides out of the phone case to be used and slides into the phone case when not in use.

18. The smart phone with integrated vape pen according to claim 15 wherein a vaping application program executing on the smart phone monitors and controls operation of the vape pen.

\* \* \* \* \*